Reissued Dec. 27, 1938 Re. 20,957

UNITED STATES PATENT OFFICE 20,957

LUBRICATING COMPOSITION

Chester Tietig, Covington, Ky.

No Drawing. Original No. 2,063,473, dated December 8, 1936, Serial No. 691,248, September 27, 1933. Application for reissue October 20, 1938, Serial No. 236,071

7 Claims. (Cl. 87—9)

This invention relates to a lubricating oil which is particularly adapted to the lubrication of internal combustion engines. It is intended for use in the crank cases of such engines.

Broadly stated the oil is a solution of the petroleum sulfonic acid salt of a heavy metal dissolved in any good ordinary lubricating oil suitable for putting in crank cases of internal combustion engines as a lubricant. By such an oil I mean an oil of good lubricating properties, comparatively free from or low in wax and of a viscosity less than 80 seconds Saybolt at 210° F. and greater than 45 seconds Saybolt at 210 degrees Fahrenheit. An important point is however that the sulfonic salt is present in amount less than five percent by weight and more than 0.10% by weight. If the content is as high as 5% the oil becomes too viscous to handle properly in force-feed lubrication systems and if the amount of salt present is less than 0.10%, its peculiar beneficial effects are not realized.

These beneficial effects are due to the leaving in the combustion cylinder, after the oil is consumed or burned, a slight residue of heavy metal oxide or other compounds which work into the pores of the cast iron of the cylinders, piston rings and pistons and make these surfaces smooth, non-scoring and cause them to operate with less friction for a longer time and to retain compression better and for a longer period.

This application is a continuation-in-part of my co-pending application Serial No. 449,685 filed May 3, 1930.

The heavy metals, the petroleum sulfonic salts of which may be incorporated into oil according to my invention are; lead, tin, copper, zinc, cadmium and mercury. Lead is the one preferred and the rest are regarded as full equivalents.

The sulfonic acids used to make the salts may be paraffin sulfonic acids, olefine sulfonic acids, naphthene sulfonic acids or mixtures of two or more of these in any proportion. However, the naphthene sulfonic acids are preferred for the purpose of making the heavy metal salts because they confer a more acidic property to the finished lubricants. This acidity, so long as it is not so high as to be corrosive, is desirable in a lubricant since it enables the film to cling more tightly to the metal on account of chemical affinity thereto. Oils having less than a 5% by weight content of these salts do not present an objectionable acidity.

The sulfonic salts may be made in any known way from either water soluble petroleum sulfonic acids or those that are water insoluble, or mixtures of these two.

In my co-pending application Serial No. 567,211, filed October 6, 1931, now U. S. Patent 1,974,089 of September 18, 1934, I have described a way of making my improved lubricants directly from suitable oil stocks which are in process of clarification. In this process gaseous hot $SO_3$ gas is blown through hot oil containing activated clay in suspension, the excess $SO_3$ is removed by heating further, the oil neutralized with PbO and all insoluble matter then removed by filtration. The filtrate then contains a percentage of dissolved lead sulfonic salt the amount of which can be regulated by varying the time during which the oil is blown with $SO_3$, the temperature of the gases and other factors. Any competent chemical engineer can control this process when its main points have once been explained to him.

Besides such a method, the sulfonic salts may be made by isolating petroleum sulfonic acids made by any known process and neutralizing them with any suitable metal oxide or metal salt. In the latter case, there is usually an insoluble residue of inorganic (not sulfonic) salt to be removed. The so-prepared sulfonic salts may then be dissolved in suitable lubricating oil, which may be heated sufficiently to effect the solution. Such ordinary ways of preparing the sulfonic acid salts are capable of being carried out by chemists without any further directions.

I am aware that petroleum sulfonic acid salts have been mixed with oils to make greases, but in order that this could be done it was necessary to use from 5% to 25% by weight of heavy metal sulfonic acid salts. The resulting mixture was entirely unsuited for use in a lubricating system wherein fluid oil has to be pumped. My oil is useful to lubricate automobile engines internally, while the greases made previously by incorporating oil with heavy metal petroleum sulfonic acid salts were intended for use only in the differentials and transmissions of heavy trucks. Further, my preparations are solutions whereas no solubility of sulfonic salt in oil was apparent in the grease preparations by any test with which I am familiar. As disclosed in my previous application Serial No. 449,685, if I desire to use the advantageous properties of lead naphthene sulfonic acids to make greases, I may do so by incorporating from 5% to 25% by weight of lead—or other heavy metal sulfonic salts with oil.

I claim as my invention:—

1. A composition of matter comprising less than 5% and at least 0.10% by weight of a naphthene sulfonic acid salt of a heavy metal, which salt is dissolved in mineral lubricating oil.

2. A composition of matter comprising less than 5% and at least 0.10% by weight of a lead salt of a naphthene sulfonic acid, which salt is dissolved in mineral lubricating oil.

3. A composition of matter comprising less than 5% and at least 0.10% by weight of a lead salt of a naphthene sulfonic acid which salt is dissolved in a lubricating oil having properties suitable for use in the crank cases of internal combustion engines.

4. A composition of matter comprising a heavy metal salt of a naphthene-sulfonic acid dissolved in mineral lubricating oil.

5. A composition according to claim 4 in which the heavy metal is lead.

6. A composition according to claim 4 in which the lead salt is present in proportions ranging between 0.1 and 25% by weight.

7. A mineral lubricating oil pumpable under ordinary conditions thru the lubricating systems of internal combustion engines which consists of a complete solution of less than five percent by weight and more than 0.1% by weight of a heavy metal salt of a petroleum sulfonic acid in a freely mobile crank case lubricating oil for internal combustion engines which oil has an original viscosity before solution therein of the heavy metal salt, of less than 80 seconds Saybolt at 210° F. and greater than 45 seconds Saybolt at 210 degrees Fahrenheit.

CHESTER TIETIG.